(12) United States Patent
Whaites et al.

(10) Patent No.: US 6,381,950 B1
(45) Date of Patent: May 7, 2002

(54) ENGINE NOZZLE ARRANGEMENT FOR AN AIRCRAFT

(75) Inventors: Colin Whaites; Peter R. House; Robert Brown, all of Lancs (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/688,682

(22) Filed: Oct. 17, 2000

Related U.S. Application Data

(63) Continuation of application No. PCT/GB00/02572, filed on Jul. 5, 2000.

(30) Foreign Application Priority Data

Jul. 7, 1999 (GB) .............................. 9915949

(51) Int. Cl.⁷ .............................. F02K 3/04; B64C 9/38
(52) U.S. Cl. ...................... 60/264; 60/230; 239/265.17; 239/265.35; 239/265.37
(58) Field of Search .......................... 60/230, 232, 264; 239/265.17, 265.35, 265.37, 127.13

(56) References Cited

U.S. PATENT DOCUMENTS

| | | | |
|---|---|---|---|
| 3,601,340 A | | 8/1971 | Hilbig |
| 3,647,141 A | | 3/1972 | Murday |
| 3,837,579 A | * | 9/1974 | Camboilives et al. .. 239/265.39 |
| 4,463,903 A | * | 8/1984 | Nightingale ........... 239/265.17 |
| 4,502,637 A | | 3/1985 | Nightingale |
| 4,835,961 A | | 6/1989 | Presz, Jr. et al. |
| 5,016,818 A | * | 5/1991 | Nash et al. ............... 239/127.1 |
| 6,164,059 A | * | 12/2000 | Liang et al. ................... 60/230 |
| 6,179,225 B1 | * | 1/2001 | Bouiller et al. ........ 239/265.17 |

FOREIGN PATENT DOCUMENTS

| | | |
|---|---|---|
| DE | 1 100 385 | 2/1961 |
| DE | 36 19 652 | 10/1990 |
| EP | 0 972 930 | 1/2000 |
| GB | 1141051 | 1/1969 |
| GB | 2034414 | 6/1980 |
| GB | 2114229 | 8/1983 |
| GB | 2260369 | 4/1993 |
| WO | WO 98/59162 | 12/1998 |

* cited by examiner

Primary Examiner—Charles G. Freay
(74) Attorney, Agent, or Firm—Nixon & Vanderhye P.C.

(57) ABSTRACT

An engine nozzle arrangement for an aircraft comprises a nozzle (18) for hot exhaust gases, and a shroud (20) for the stream of hot exhaust gases emerging from the exhaust nozzle. The shroud includes an intake for a boundary layer of air for cooling the stream of exhaust gases.

11 Claims, 7 Drawing Sheets

ENGINE NOZZLE ARRANGEMENT FOR AN AIRCRAFT

This is a continuation of PCT application No. PCT/GB00/02572, filed Jul. 5, 2000, the entire content of which is hereby incorporated by reference in this application.

BACKGROUND OF THE INVENTION

This invention concerns an engine nozzle arrangement for an aircraft.

SUMMARY OF THE INVENTION

According to one aspect of the present invention there is provided an engine nozzle arrangement for an aircraft comprising a nozzle for hot exhaust gases, and a shroud for the stream of hot exhaust gasses emerging from the nozzle, the shroud including means providing an intake for a boundary layer of air for cooling the stream of exhaust gases.

In a preferred form of the invention, the shroud comprises at least one pair of adjustable plates mounted adjacent the hot exhaust nozzle.

One such pair is advantageously movable into a position at least partially blocking the exhaust stream, for providing a reverse thrust. For this purpose, the plates of said pair are conveniently rotatably mounted to provide blocking doors in one rotational position.

Preferably, the same, or another, pair of plates is arranged to be angularly movable relative to an axis of the hot exhaust nozzle for directing the hot exhaust stream for providing vectoring thrust.

According to another aspect of the invention there is provided an engine nozzle arrangement for an aircraft comprising a nozzle for hot exhaust gases, and a shroud including at least one pair of vectoring plates for controlling the direction of the hot exhaust stream.

The invention is particularly advantageous in terms of stealth and enhanced aircraft performance.

In particular, the provision of the shroud over the hot exhaust stream reduces the impact of heat radiation on the surrounding atmosphere and thereby improves infrared (IR) stealth performance.

Further, the supply of a boundary layer of air into the exhaust stream has the advantage of cooling the hot exhaust nozzle and the exhaust stream as well as the shroud, and this again improves IR stealth performance.

Likewise, the boundary layer of cooling air has the effect of reducing the acoustic impact of the hot exhaust stream on the surrounding atmosphere and hence improves acoustic stealth.

The shroud is preferably designed to have a minimal radar cross section. For example, the shroud may be arranged to cover at least a portion of the exhaust nozzle as well as the hot exhaust stream and may thereby provide a reduced radar cross section for the exhaust nozzle and exhaust gases in use.

Aircraft performance may also be significantly improved by the provision of adjustable plates comprising blocking doors for providing reverse thrust and/or vectoring plates for providing vectoring thrust.

The invention has application with both single and dual engine configurations.

A further aspect of the invention features an aircraft including an engine nozzle arrangement as set out above.

BRIEF DESCRIPTION OF THE DRAWINGS

The invention is described further, by way of example, with reference to the accompanying drawings, in which.

DETAILED DISCUSSION OF PREFERRED EMBODIMENTS

Figure 1:
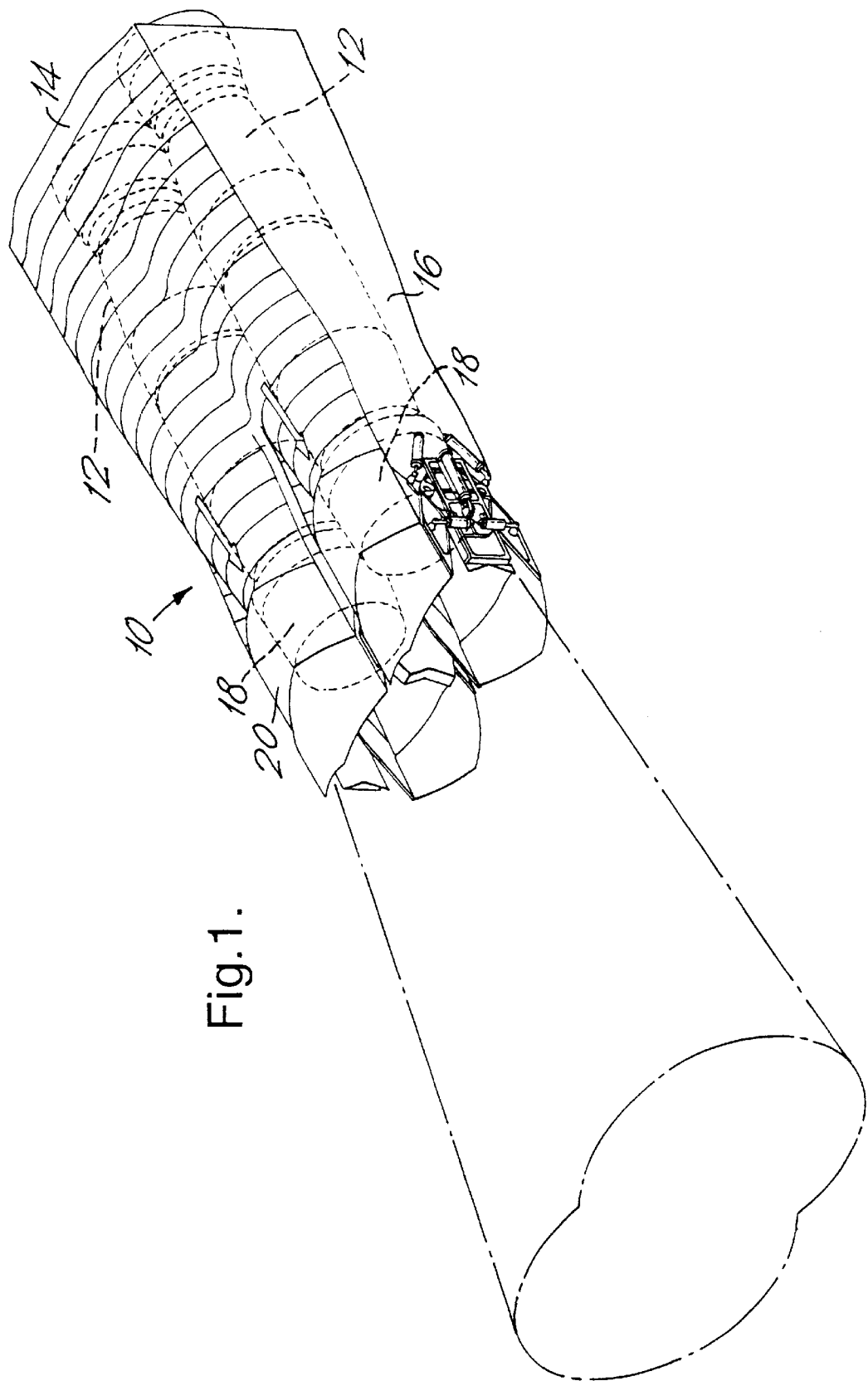
FIG. 1 is a schematic perspective view of an engine nozzle arrangement according to the invention.
Figure 2:
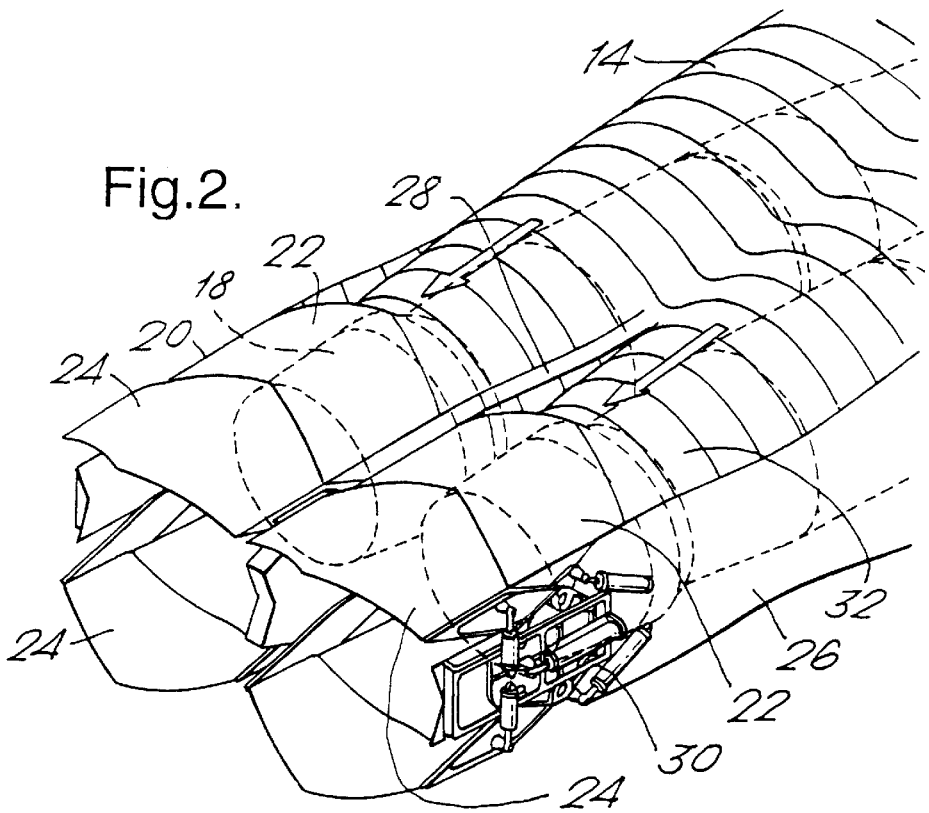
FIG. 2 is an enlarged fragmentary perspective view of the engine nozzle arrangement corresponding to FIG. 1 and showing details of adjustable control plates of the arrangement in a normal flight position.

Referring initially to FIGS. 1 and 2, these show an engine nozzle arrangement 10 for an aircraft according to the resent invention, the arrangement here being applied to a dual engine configuration.

As shown, the engine nozzle arrangement 10 comprises a dual pair of engines 12, shown in dashed lines, comprising a standard structural part of a conventional aircraft. A housing 14, also comprising a standard structural part of an aircraft, is mounted over the pair of engines 12, and comprises a box shaped body 16 which is longitudinally tapered in the direction of an exhaust nozzle 18 of each of the engines 12 and which is laterally curved and contoured to conform to the shape of each of the engines 12, as shown.

Figure 2A:
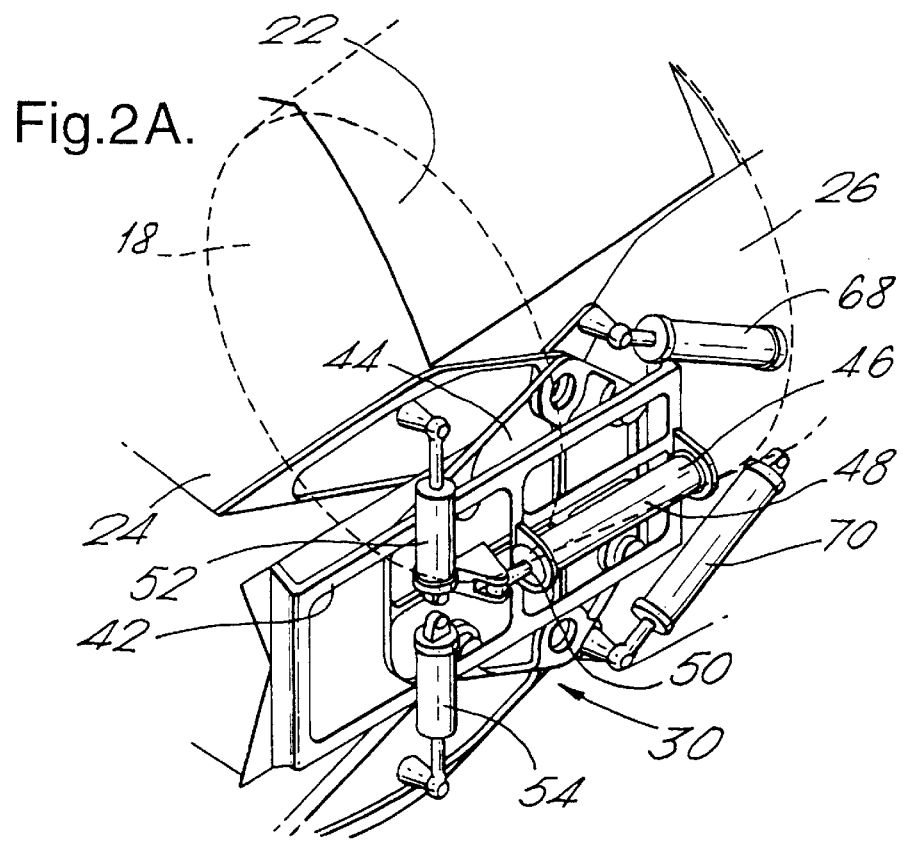
FIG. 2a is an enlarged detail from FIG. 2 showing details of a control mechanism for the adjustable control plates in an operational condition for setting the control plates in the normal flight position.

The housing 14 also includes respectively, covering each exhaust nozzle 18 and covering also a region downstream of the nozzle 18 into which the stream of hot exhaust gases is discharged in use, a shroud 20 comprising two pairs of control plates 22, 24 whose function will be described below. Each pair of the control plates 22, 24 is mounted between a respective outboard shear web or wall 26 and a parallel central shear web or partition wall 28 of the body 16 so as to be adjustable by means of a control mechanism 30. The control mechanism 30, which is shown detail in FIGS. 2a, 3a and 4a, is operable:

(a) to adjust the relative angular orientation of the two plates in each pair, and
(b) selectively to adjust the orientation of one pair of plates relative to the other pair, as described below.

Turning more particularly to the two pairs of control plates 22 and 24 associated with each of the exhaust nozzles 18, the first pair of control plates 22 is mounted between the shear webs 26, 28 at a downstream end 32 of the body 16 immediately adjacent and facing one another on opposite sides of the axis of the respective exhaust nozzle 18. The control plates 22 are thus mounted entirely independently of the associated exhaust nozzle 18. The second pair of control plates 24 is mounted between the shear webs 26, 28 downstream of the first pair of control plates 22, and facing one another on opposite sides of the axis of the associated exhaust nozzle 18. Again, the plates 24 are mounted entirely independently of the associated exhaust nozzle 18.

Figure 5:
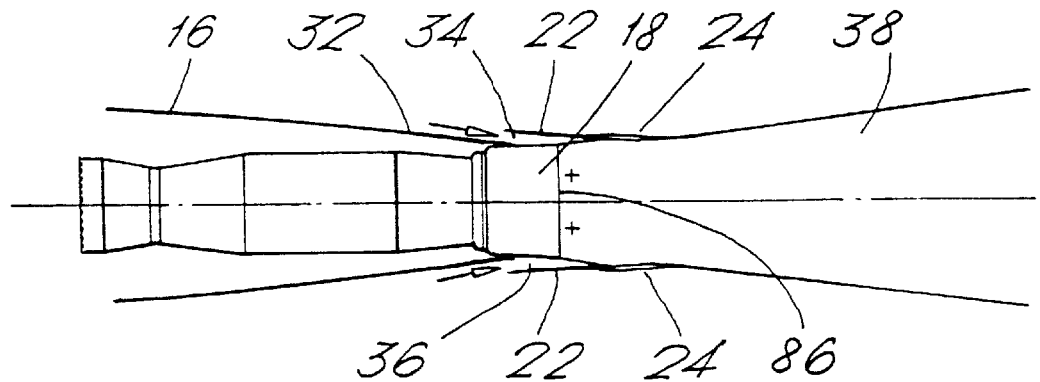
FIGS. 5 and 6 are diagrammatic views of the engine nozzle arrangement in operation with the control plates in the positions of FIGS. 1 and 2.

The two control plates 22 are normally situated to converge towards the axis of the exhaust nozzle 18 in order to form with the downstream end 32 of the body 16 respective upper and lower intake channels 34, 36 for supplying a boundary layer of cooling air into the hot exhaust stream 38 (see FIG. 5). The two plates 22 can be adjusted jointly by means of the control mechanism 30 for increasing or decreasing the cross-sectional area of each of the intake channels. 34, 36.

In addition, the two control plates 22 are mounted for angular movement independently of one another relative to the axis of the engine nozzle 12 for reasons to be described more fully below.

Figure 3:
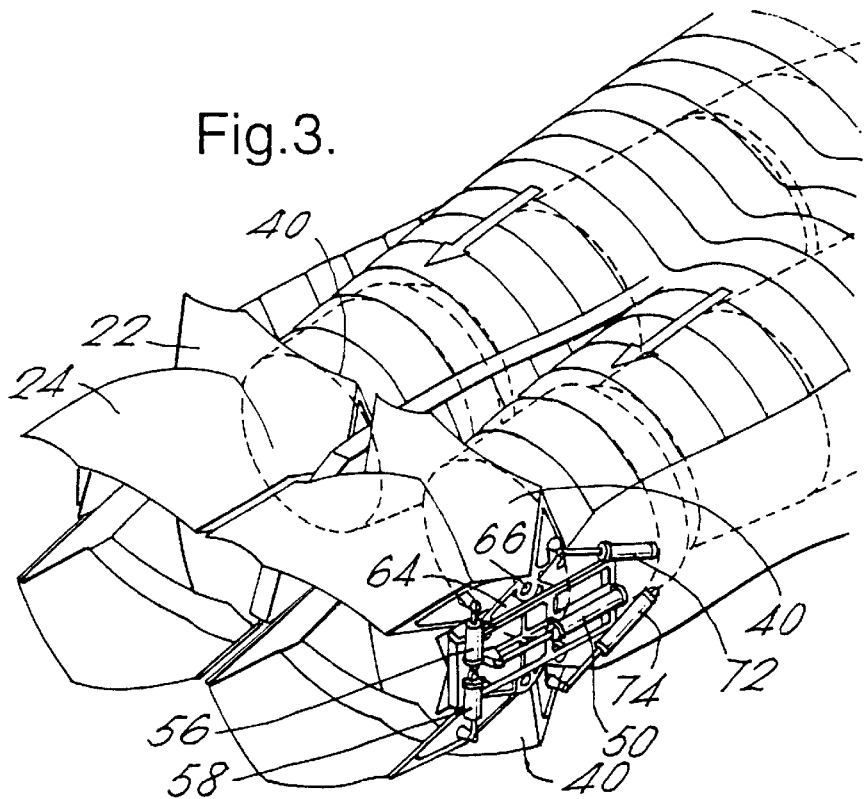
FIG. 3 is an enlarged fragmentary perspective view similar to that of FIG. 2 but showing the control plates in a reverse engine thrust position.
Figure 3A:
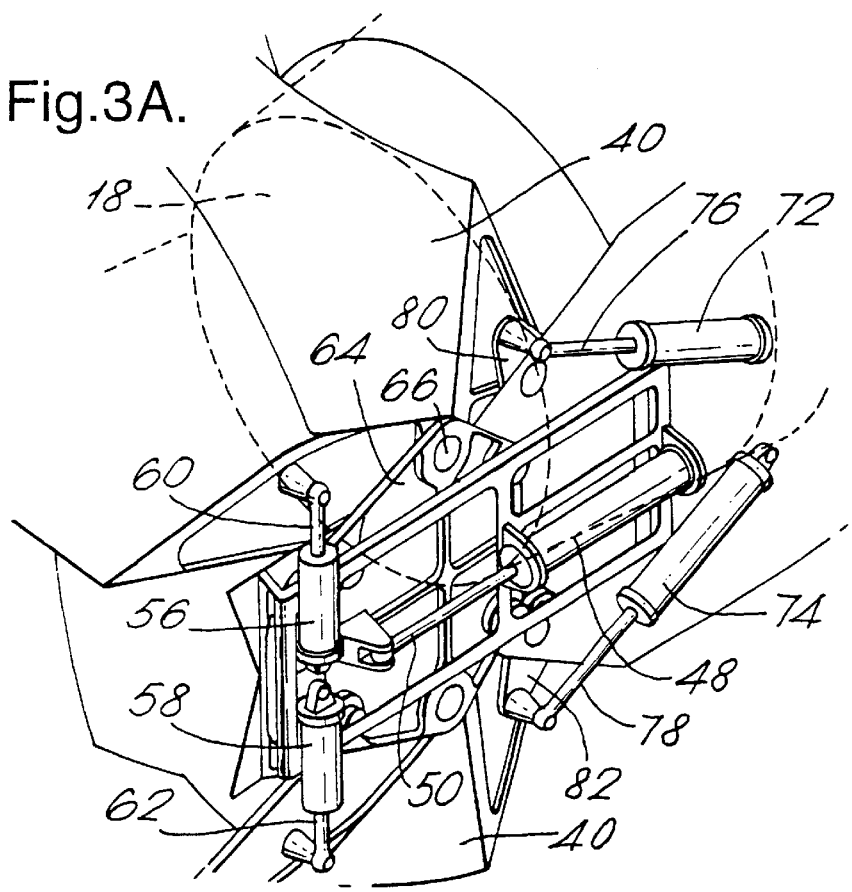
FIG. 3a is an enlarged detail corresponding to FIG. 2a showing the control mechanism in a condition for setting the control plates in the reverse engine thrust position.
Figure 7:
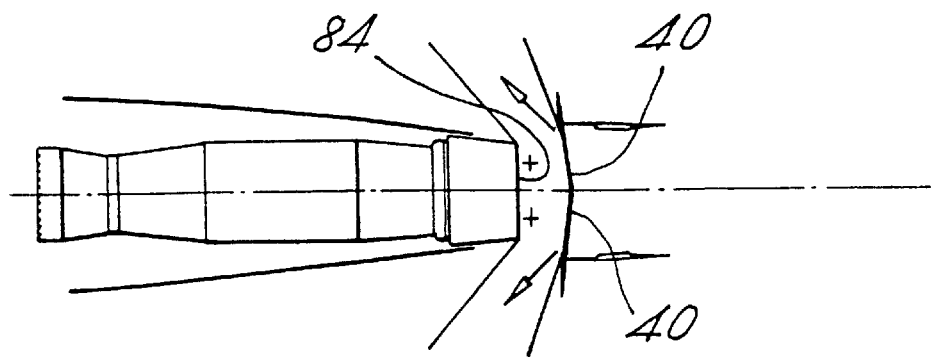
FIG. 7 is as diagrammatic view of the engine nozzle arrangement in operation with the control plates in the position of FIG. 3.

The pair of control plates 22 are in addition mounted to rotate through approximately 90 degrees into a blocking position as shown in FIGS. 3, 3a and 7. In this position, the control plates 22 form blocking doors 40 at least partially blocking the hot exhaust stream from the associated exhaust nozzle 18 for providing a reverse thrust.

The two control plates 24 associated with each of the exhaust nozzles 18 are mounted normally to be in line with the control plates 22 as a continuation thereof, for example as shown in FIG. 5.

However, these plates 24 are also arranged to be angularly adjustable in common relative to the axis of the exhaust nozzle 18 by means of the control mechanism 30, for reasons to be described below.

Details of the control mechanism 30 can be seen in FIGS. 2a, 3a and 4a. It is to be understood that these Figures show the control mechanism provided on one side of each pair of the control plates 22, 24 and that a similar mechanism will be also provided on the opposite sides of these plates.

As shown, the control mechanism 30 comprises a rectangular frame 42 mounted on the shear web 26 to provide a track for a slide plate 44. A first piston and cylinder arrangement 46 is mounted between the track 42 and the slide plate 44 for determining their relative positions. More particularly, the piston 48 of the arrangement 46 is mounted on the track 42 while the piston 50 is connected to the slide plate 44 for movement longitudinally of the shear web 26 between a retracted condition shown in FIG. 2a and an extended condition shown in FIG. 3a.

Two further piston and cylinder arrangements 52, 54 are mounted on the slide plate 44 and are arranged in line with one another at right angles to the axis of the piston and cylinder arrangement 46. Each of the piston and cylinder arrangements 52, 54 comprises a respective cylinder 56, 58 fixed to the slide plate 44 and a respective piston 60, 62 attached to a central region of one of the control plates 24. An inboard end of each control plate 24 is pivotally connected to a respective ear 64 of the slide plate 44 by means of a pivot 66.

Thus by selective extension of the piston 48, the slide plate 44 and hence the two control plates 24 can be displaced axially away from and towards the exhaust nozzles 18. Likewise, by selective extension of the two pistons 60, 62 the angular orientation of each of the control plates 24 can be adjusted as desired.

Two further piston and cylinder arrangements 68, 70 are mounted directly on the shear web 26, and comprise cylinders 72, 74 pivotally mounted on the shear web 26 and pistons 76, 78 connected to lever arms 80, 82. As best seen in FIG. 3a, the two lever arms 80, 82 are fixedly attached to the two control plates 22 and are pivotally mounted on the shear web 26. Hence, extension of the pistons 76, 78 serves to rotate the control plates 22, for example from the position shown in FIG. 2a to the position shown in FIG. 3a.

The operation of the engine nozzle arrangement according to the invention will now be described.

Figure 6:
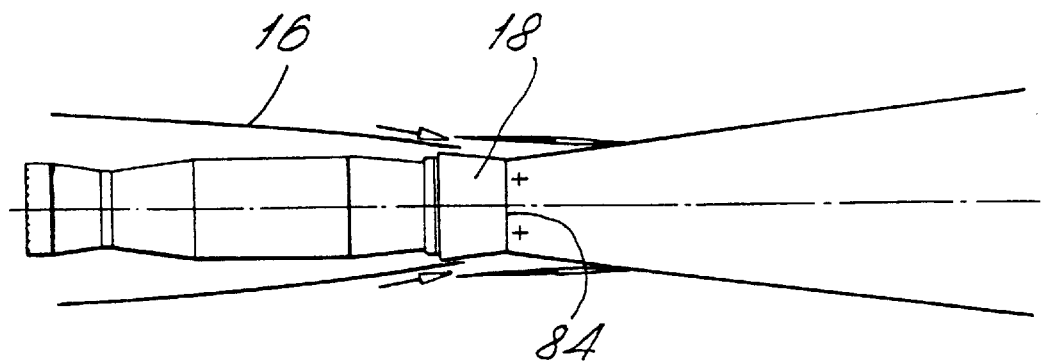

Referring initially to FIGS. 2, 5 and 6, these show the engine nozzle arrangement in its main operating condition for normal flight. In this condition, both the piston and cylinder arrangements 68, 70 are in a partially retracted condition and the lever arms 80, 82 are drawn towards the cylinders 72, 74 to position the control plates 22 at similar acute angles relative to the axis of the adjacent exhaust nozzle 18. The slide plate 44 is fully retracted relative to the track 42, and the piston and cylinder arrangements 52, 54 are also in a partially retracted condition to position the two control plates 24 in line with the control plates 22.

FIGS. 5 and 6 show how the exhaust nozzle 18 can be set either to provide a standard diameter exhaust opening 84 for normal flight or an enlarged exhaust opening 86, up to a maximum diameter, e.g. for landing. The body 16 of the housing 14 can be seen tapering towards the exhaust nozzle 18, with the pair of control plates 22 set angularly relative to the body 16 to provide the upper and lower intake channels 34, 36. The pair of control plates 24 simply form a continuous extension of the control plates 22.

In this condition, the exhaust stream 38 from the exhaust nozzle 18 is axially directed to provide normal forward thrust. The presence of the upper and lower intake channels 34, 36 ensures that a boundary layer of cooling air is drawn into the exhaust stream 38, partly as a result of the forwards movement of the aircraft and partly as a result of a negative pressure generated in the two intake channels as a result of the exhaust stream issuing from the exhaust nozzle 18. The cooling air serves both to cool the downstream end of the exhaust nozzle 18 itself, and to cool the hot exhaust gases in the exhaust stream 38. The cooling air also cools the control plates 22 and 24.

The shroud 20 provided by the control plates 22, 24 serves to reduce the impact of heat radiation from the exhaust nozzle 18 and the hot exhaust stream 38 on the surrounding atmosphere and has the effect of improving IR stealth performance. Likewise, the cooling of the control plates 22 and 24 and the exhaust nozzle 18 and hot exhaust stream 38 with the boundary layer of cooling air also has the effect of improving IR stealth performance. The boundary layer of cooling air further has the effect of cooling the hot exhaust gas stream 38 and thereby reducing acoustic impact on the surrounding environment and improving both IR and acoustic stealth.

Furthermore, the provision of the shroud 20 covering a portion of the exhaust nozzle 18 and the hot exhaust stream in use serves to minimise radar detection.

Additionally, the provision of the shroud and the extended shear webs 26, 28 together with the body 16 housing both engines 12 and their exhaust nozzles 18 serve to minimise the exposed slopes of this part of the aircraft structure and result in reduced drag. Additional improvements in drag can also be obtained by exhausting other aircraft equipment into the central cavity between the two exhaust nozzles 18 to fill the gap there.

Turning next to FIGS. 3 and 7, these show the control plates 22 rotated through an angle of approximately 90 degrees to form the blocking doors 40 in the path of the exhaust stream 38 in order to provide a reverse thrust. In this condition, the slide plate 44 is extended relative to the track 42 so as to displace the control plates 24 away from the exhaust opening 84, while the two piston and cylinder arrangements 52, 54 remain in a partially retracted condition so that the angular orientation of the control plates 24 is unaltered. The two piston and cylinder arrangements 72, 74 by contrast are extended to rotate the lever arms 80, 82 through 90 degrees, and consequently also the control plates 22.

As shown in FIG. 7, the blocking doors 40 thus formed by the control plates 22 constitute a complete barrier in the axial direction of the exhaust stream 38, but they could equally well be arranged to form only a partial barrier. The result is that the thrust of the exhaust stream 38 is reversed while the intake channels 34, 36 are enlarged both for the purpose of providing exhaust channels for the reversed exhaust flow, and intake channels of increased area for a boundary layer of air. This increase in area of the intake channels 34, 36 ensures that additional cooling air is provided both to the reverse flow exhaust stream 38 and to the two control plates 22 in the path of this exhaust stream.

It is also to be noted that in this position, the two control plates 24 remain in their normal position and thereby serve to provide added support to the outboard sides of the control plates 22.

A particular advantage of this configuration of the exhaust nozzle 18 is that the reverse thrust assists in braking and reduces the load on the actual brakes. As a result, reduced runway landing length may be required and maintenance requirements for the actual brakes may be reduced.

Figure 4:
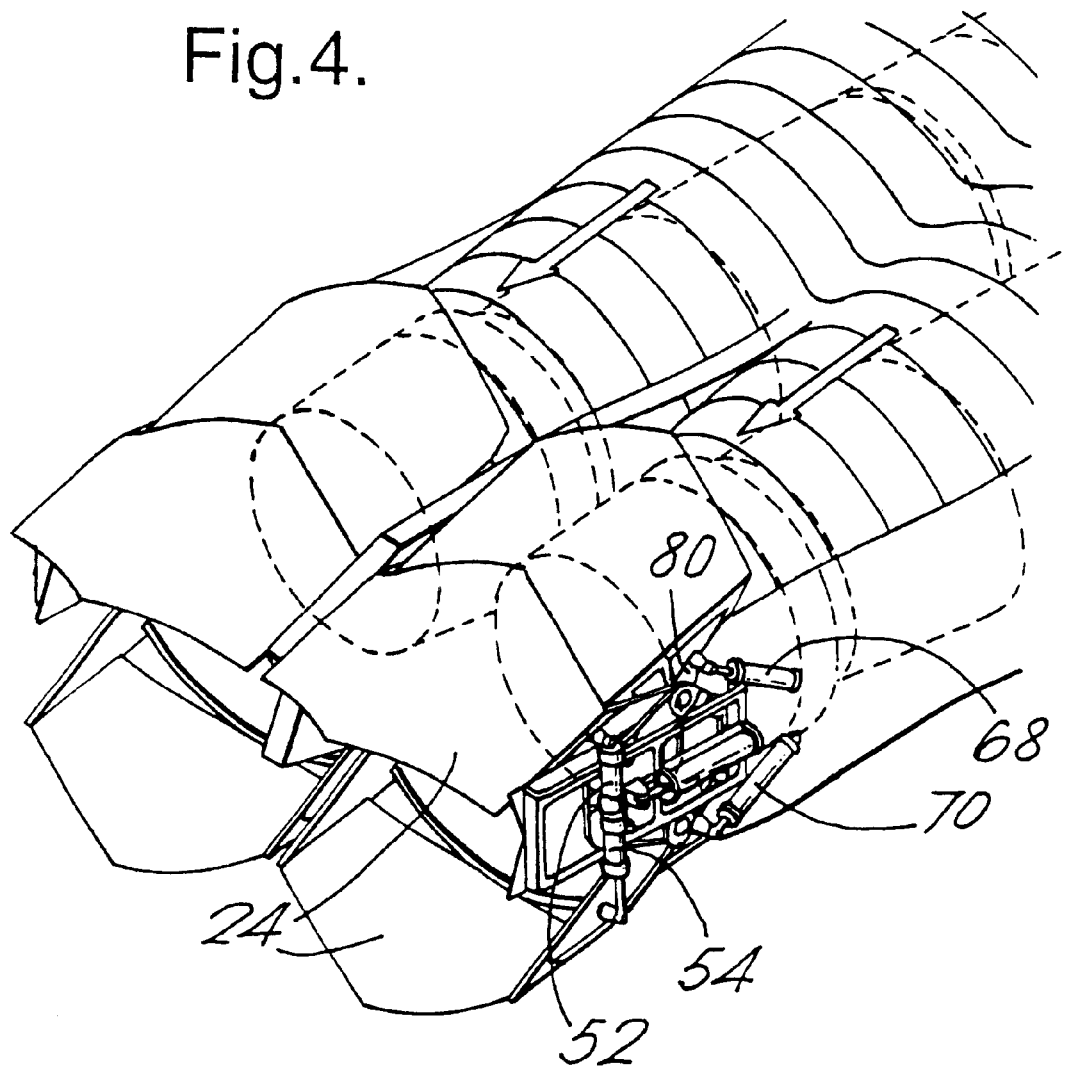
FIG. 4 is an enlarged fragmented perspective view similar to that of FIG. 2 but showing the control plates in a vectoring engine thrust position.
Figure 4A:
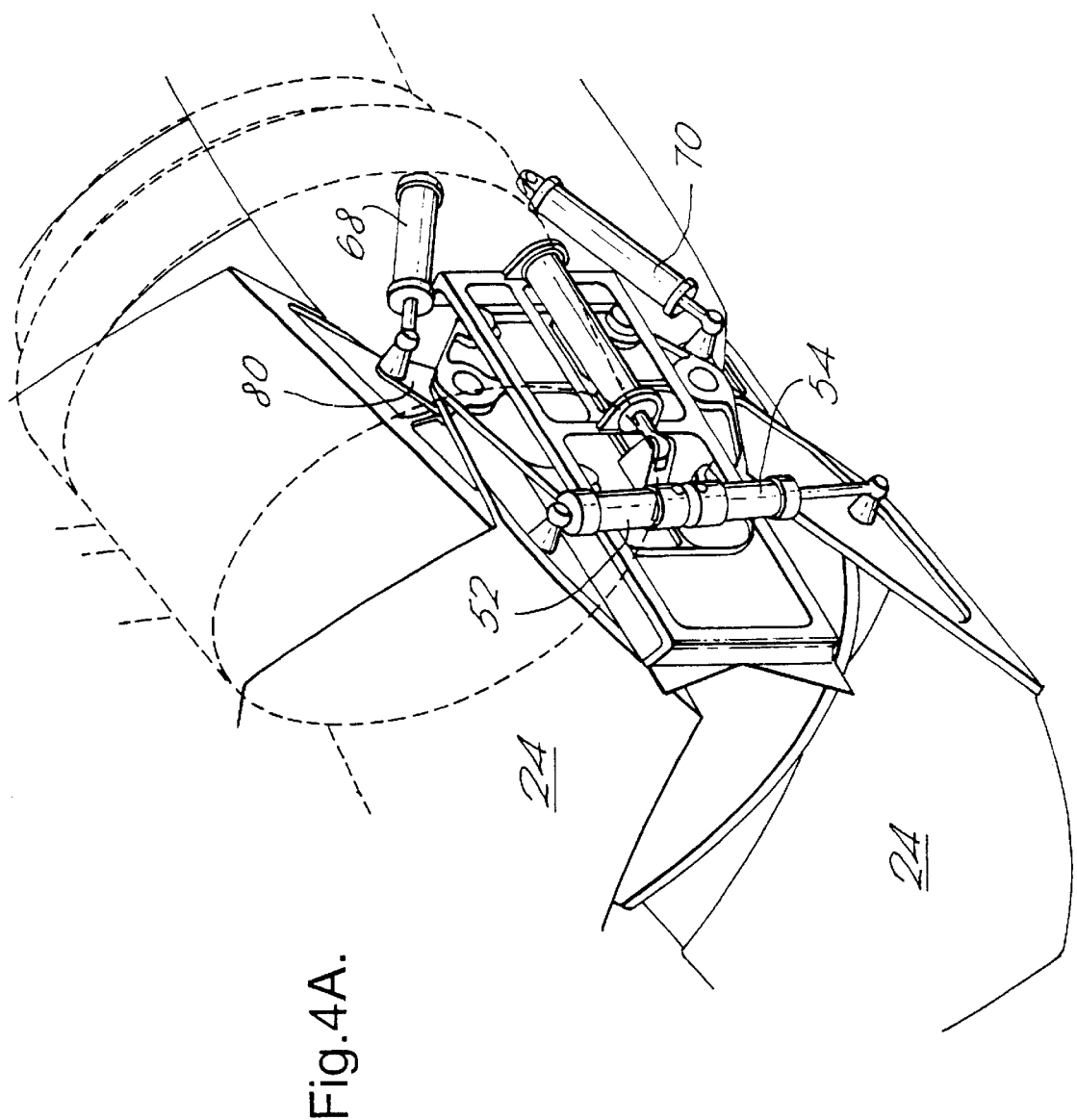
FIG. 4a is an enlarged detail corresponding to FIG. 2a showing the control mechanism in a condition for setting the control plates in the vectoring engine thrust position.
Figure 8:
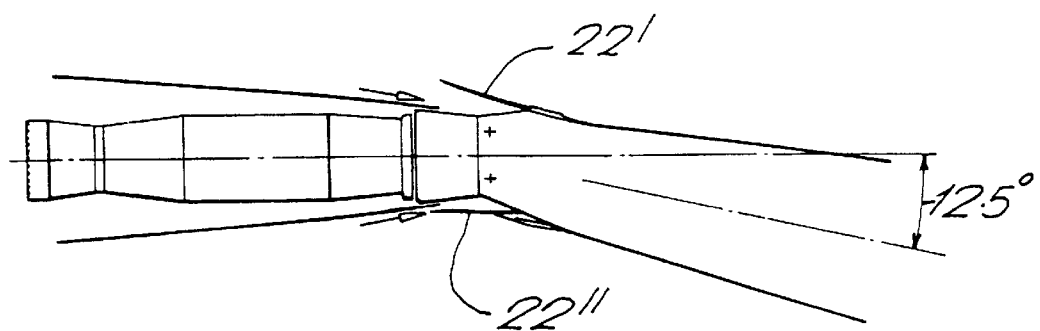
FIGS. 8 and 9 are diagrammatic views of the engine nozzle arrangement in operation with the control plates in the position of FIG. 4.
Figure 9:
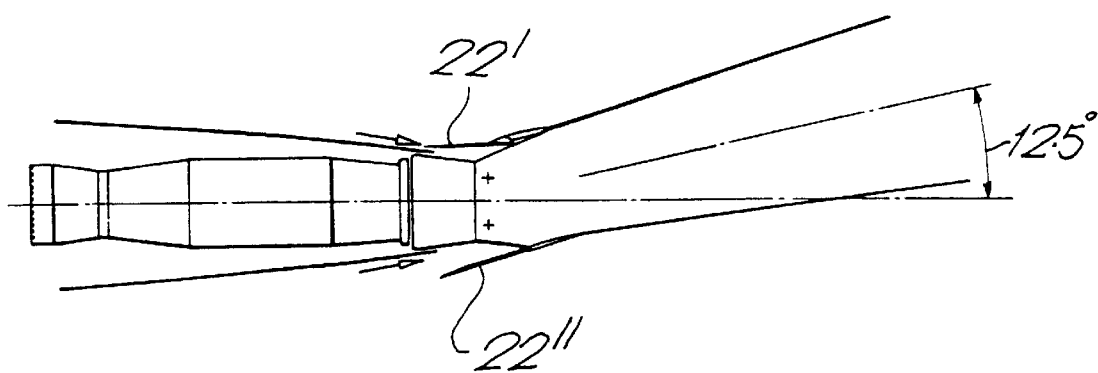

Turning next to FIGS. 4, 8 and 9, these show the control plates 22 and 24 being employed to direct and control the exhaust stream of gases thus to provide a vectoring thrust. In the configuration shown in FIGS. 4 and 8, the piston and cylinder arrangement 68 is partially extended to rotate the associated lever arm 80 in order to increase angle of the upper control plate 22 relative to the axis of the exhaust nozzle 18. At the same time, the piston and cylinder arrangement 70 is fully retracted to reduce the angle of the lower control plate 22 relative to said axis.

The slide plate 44 is fully retracted relative to the track 42, and the piston and cylinder arrangement 52 is full retracted to increase the angle of the upper control plate 24 relative to the axis of the exhaust nozzle 18 by 15 degrees so as to align the upper control plate 24 with the upper control plate 22. At the same time, the piston and cylinder arrangement 54 is partially extended in order to angle the lower control plate 24 more steeply away from the axis of the exhaust nozzle 18.

The two control plates 22 are thus independently rotated through different angles to provide a downward vectoring thrust. More particularly, the upper one 22' of the two control plates 22 has been rotated through an angle of 15°, while the lower one 22" of the two control plates 22 has been rotated in the same direction through an angle of 7°, with the result that the upper intake channel 34 for the boundary layer of air has a substantially increased cross-sectional area while the lower intake channel 36 for the boundary layer of cooling has a significantly decreased cross-sectional area.

In addition, the two control plates 24 have also been rotated relative to the axis of the exhaust nozzle 12 through a common angle of 15° in order to combine with control plates 22 in directing the exhaust stream 80 of hot gases. A boundary layer of cooling air is provided as before both to the downstream end of the exhaust nozzle 18 and to the hot exhaust stream 38, giving the same advantages described above.

FIG. 9 shows a situation similar to that of FIG. 8 but with the exhaust stream angled upwardly by the same amount instead of downwardly.

The nozzle position shown in FIGS. 8 and 9 provides a vectoring thrust available both in take-off and landing situations and in normal flight conditions. Such vectoring thrust provides additional flight control beyond that normally provided by the flight control surfaces and may permit a reduction in the surface area of such flight control surfaces. By providing independent rotation of the two control plates in at least one of the pairs, additional control is possible. If used in take-off conditions, reduced runway requirements may result.

By employing the control plates 22, 24 of the shroud 20 rather than the normal control surfaces of the aircraft to adjust the pitch of the aircraft, trim drag may be reduced. In addition, a system of pressure sensors (not shown) may be located near the shroud to provide input signals to the aircraft flight control computer for calculating minor adjustments to the control plates 22, 24 for the purpose of reducing trim drag.

The present invention offers a number of significant advantages in aircraft flight and performance including improved stealth in the air, enhanced performance maneuverability, and a reduction in certain maintenance requirements.

What is claimed is:

1. An engine nozzle arrangement for an aircraft comprising:
   a nozzle for hot exhaust gases,
   a shroud for the stream of hot exhaust gases emerging from the exhaust nozzle,
   the shroud including means providing an intake for a boundary layer of air for cooling the stream of exhaust gases, said shroud comprising two pairs of plates, one pair of said plates located upstream of the other pair of said plates, said one pair of said plates comprising closeable blocking doors for providing reverse thrust when closed and said other pair of said plates angularly moveable with respect to an axis of said nozzle for altering direction of said exhaust gases and providing pitch control of said aircraft.

2. An engine nozzle arrangement according to claim 1 in which said one pair of plates is arranged to provide upper and lower air intake openings.

3. An engine nozzle arrangement according to claim 1 in which said one pair of plates is adjustable for altering direction of the exhaust flow of gases and for providing flight control of said aircraft.

4. An engine nozzle arrangement according to claim 1 in which said one pair of said plates comprise vectoring plates which are mounted for angular movement relative to the axis of the nozzle for directing the exhaust flow of gases for flight control purposes.

5. An engine nozzle arrangement according to claim 1 further comprising mounting means for supporting said two pairs of plates independently of the hot exhaust nozzle.

6. An engine nozzle arrangement according to claim 5 wherein the mounting means comprise a housing formed with parallel shear webs flanking the engine, the shear webs being extended beyond the nozzle and supporting the shroud therebetween.

7. An engine nozzle arrangement according to claim 1 further comprising control means for adjusting the plates.

8. An engine nozzle arrangement according to claim 7 in which the control means comprise a lever mechanism operated by fluid control means.

9. An engine nozzle arrangement for an aircraft comprising:
- a nozzle for hot exhaust gases,
- a shroud for the hot exhaust nozzle, and
- at least one pair of vectoring plates for controlling the direction of the hot exhaust stream, said shroud comprising two pairs of plates, one pair of said plates located upstream of the other pair of said plates, said one pair of said plates comprising closeable blocking doors for providing reverse thrust when closed and said other pair of said plates angularly moveable with respect to an axis of said nozzle for altering direction of said exhaust gases and providing pitch control of said aircraft.

10. An engine nozzle arrangement according to claim 1, wherein at least one of said pairs of plates has plates located on opposite sides of said axis.

11. An engine nozzle arrangement according to claim 9, wherein at least one of said pairs of plates has plates located on opposite sides of said axis.

* * * * *